July 9, 1935.  L. SKEEL  2,007,897

FLOATING COUPLING

Filed May 3, 1934

Inventor
LEWIS SKEEL
By J. G. Quesada
Attorney

Patented July 9, 1935

2,007,897

UNITED STATES PATENT OFFICE 2,007,897

FLOATING COUPLING

Lewis Skeel, Meadville, Pa., assignor to McCrosky Tool Corporation, Meadville, Pa., a corporation of Pennsylvania Application May 3, 1934, Serial No. 723,769

6 Claims. (Cl. 279—16)

This invention relates to floating couplings or holders and while disclosed in connection with a tool holder it is clear, of course, that the invention is not restricted thereto.

Briefly, the invention looks to the provision of simple and self-adjusting means by which automatic correction is made for limited misalignment of the longitudinal axes of driving and driven members, an example of such misalignment being found in a case where a machine spindle operating a reamer or other boring tool is out of alignment with the particular work being machined, for instance, a hole or opening in a casting; in which event, the driven member carrying the reamer or other boring tool adapts itself to the condition encountered without strain upon the parts involved and without change in the axis of the hole being worked.

In its more specific aspects, the invention embodies a floating and universal joint which, while providing immediate correction for misalignment, normally holds the driven member accurately in line with the driving member against the contrary influences which, due to the very nature of the device, are invariably present; from which it will be seen that when the invention is employed in connection with a rotary boring tool, the presentation of such tool to the work and the performance of the required operation will be characterized by the absence of wobbling or other undesirable motion regardless of whether the tool is in a horizontal, vertical, or other position.

Other objects and advantages will be apparent during the course of the following description.

Figure 1:
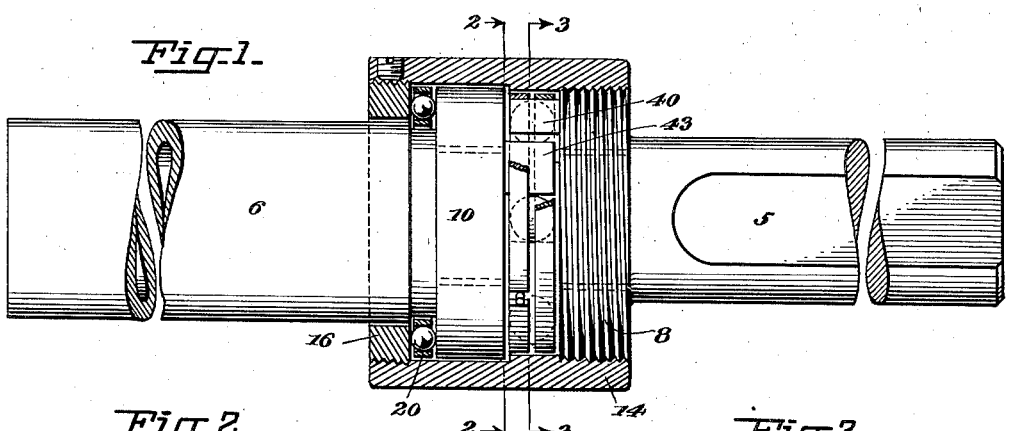
Figure 2:
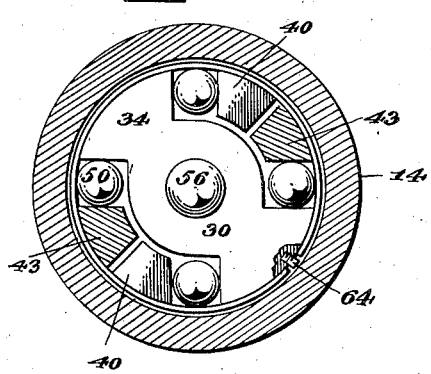
Figure 3:
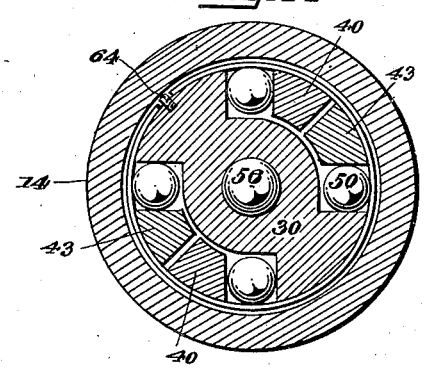
Figure 4:
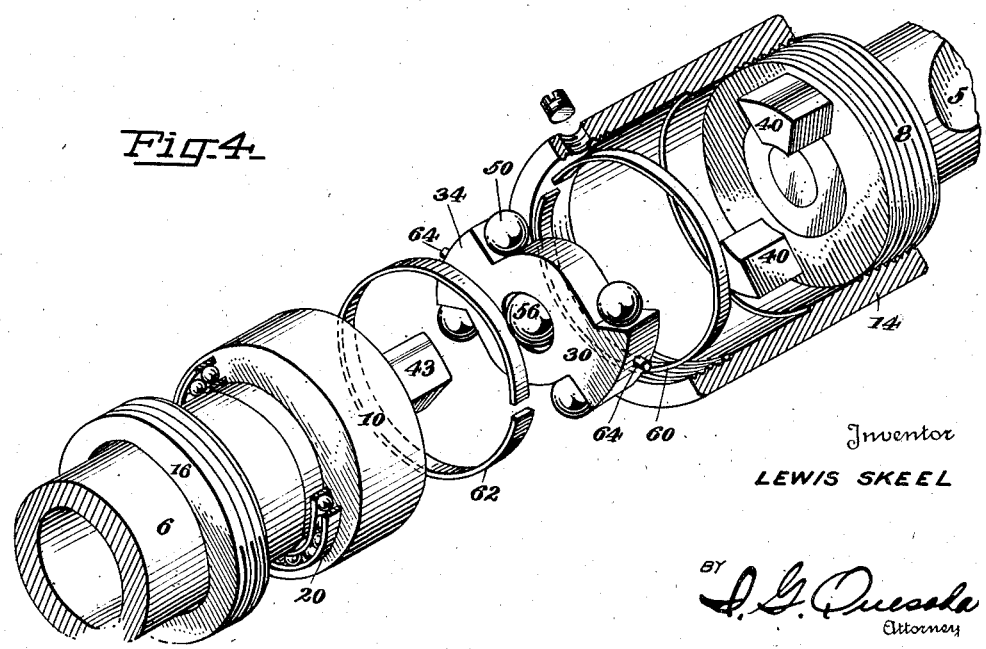

In the accompanying drawing, forming a part of this application and in which like numerals are employed to designate like parts throughout the same, Figure 1 is a vertical longitudinal sectional view through the improved coupling, parts being shown in elevation, Figure 2 is a transverse sectional view taken on line 2—2 of Figure 1, Figure 3 is a transverse sectional view taken on line 3—3 of Figure 1, Figure 4 is a fragmentary sectional group perspective of the improved coupling.

In the drawing, wherein for the purpose of illustration is shown a preferred embodiment of the invention, the numeral 5 designates a driving member which may, of course, have connection with any suitable source of power such, for example, as a machine spindle or turret head, while the numeral 6 denotes a driven member, which in the case of a tool holder is formed with a taper bore or other means for engaging a reaming or other tool.

As shown in Figures 1 and 4, the driving and driven members 5 and 6, respectively, are positioned in longitudinal alignment with opposed ends in slightly spaced relation and provided with annuli 8 and 10, respectively, secured permanently in place by screw threads or other means and forming in effect, diametrical enlargements of the opposed end portions of such members.

It will be seen from Figure 1, that the annulus 8 is externally threaded for connection with a surrounding sleeve-like housing 14 and that the housing loosely embraces and extends beyond the member 10 for the reception of and threaded connection with a retaining ring 16.

A ball bearing 20 or other anti-friction means may be located between the member 10 and the retaining ring 16 and serves the obvious purpose of minimizing friction invariably engendered as an incident to the use of the disclosed structure.

The space between the members 8 and 10 provides for the free accommodation of an intervening more or less disk-shaped floating element 30, having oppositely located radial fan-like projections or motion transmitting fingers 34. Such radial projections 34 interdigitate with the oppositely directed overlapping longitudinally extending fingers or lugs 40 and 43 of the members 8 and 10, respectively, with motion transmitting and friction minimizing spheres or elements 50 located between the sets of companion lugs 40 and 43 on one hand and the projections 34 on the other producing a means by which there is a smooth transmission of floating and rotary motion.

It is believed to be apparent that the drive is through the members 5 and 8, the lugs 40 of the member 8, the spheres 50 engaged by such lugs, the radial projections 34, the second pair of spheres driven by the fingers 34, the lugs 43, the member 10, and the part 6 of whatever nature the latter happens to be.

The more or less loose interdigitation of the lugs 40 and 43 and the projections 34, combined with the intervention of the spheres 50 overcome a substantial portion of the driving friction and at the same time permits the desired float on the part of the members 6 even under full driving strain. More particularly, the connection between the driving and driven members provides for limited lateral shifting of the member 6 with respect to the member 5, and also looks to the limited angular movement of the driven member 6 with respect to the driving member 5 should and when the occasion requires.

It is illustrated in Figures 2, 3 and 4 that the disk or floating element 30 is provided with a central opening extending entirely therethrough and receiving a center ball 56 having a diameter greater than the thickness of the element 30 to extend beyond the opposite sides of such element for engagement with appropriate contact elements carried by the driving and driven members 5 and 6, respectively, so as to take the end-thrust and allow the desired pivotal as well as horizontal float.

One of the principal features of the invention resides in the means by which the members 5 and 6 are normally held in line, especially when the associated tool is being presented to the work and during the period of initial engagement with the work. In explaining this phase of the invention, attention is invited to Figures 1 and 4, from which it will be seen that the peripheral surfaces of the fingers 34 are in the arc of the same circle and are closely engaged by the inner surfaces of flat band leaf springs 60 and 62. These springs 60 and 62 are split and the ends thereof are oppositely located and are engaged by radial pins 64 carried by and projecting radially beyond the fingers 34 thereby uniformly distributing the combined restraining effect of the springs throughout 360°.

That is to say, the diametrically opposite location of the split ends of the springs 60 and 62 provides for the uniform application of spring pressure to the lugs 40 and 43 and the radial fingers 34, as distinguished from the irregular or unequal pressure that would be produced by the employment of but a single spring.

The outer peripheral surfaces of the interdigitating lugs 40 and 43 are located inward of the peripheries of the members 8 and 10 and are closely embraced by the springs 60 and 62 so that, normally the members 5 and 6 are held accurately in line. Further, the springs 60 and the curvature of the outer surfaces of the lugs 40 and 43 and the fingers 34 coact to normally hold these parts in position for rotation about a common axis.

It has been found that while the springs 60 and 62 hold the member 6 against lateral movement or wobbling during presentation of the tool to the work or during the period of initial engagement with the work, such springs permit of the instant adaptation to misalignment between the work and the member 5.

In other words, the springs 60 and 62 constitute a yieldable restraining means holding the member 6 in line with the member 5 and against wobbling under such contrary influence as the weight of the tool carried by the member 5 when operating in a horizontal or other position, while at the same time permitting instant and automatic correction of misalignment between the work and the driving member 5.

Of course, the springs 60 and 62 do not support the driving spheres 50 because, as will be seen from Figures 2 and 3, such spheres are free to move inwardly out of contact with the springs.

With reference to the foregoing, taken in connection with the accompanying drawing, it will be seen that while I have provided a simple and automatic means of correcting limited misalignments between the work and the driving member 5, such means are restrained to a point where the member 6 and the tool carried thereby, even though these parts are in horizontal position, are prevented from wobbling and thus interfering with the proper engagement of the tool with the work, especially during the early stage of such engagement.

Having thus described the invention what is claimed is:

1. In a structure of the class described, driving and driven members having loosely interdigitating oppositely directed lugs, a floating element between said members and having projections interdigitating with said lugs, motion transmitting elements between the lugs and the projections, said projections and said lugs being provided with outer peripheral surfaces having the same radii, and companion band springs closely embracing said projections and said lugs.

2. In a structure of the class described, driving and driven members having loosely interdigitating oppositely directed lugs, a floating element between said members and having projections interdigitating with said lugs, motion transmitting elements between the lugs and the projections, said projections and said lugs being provided with peripheral surfaces having the same radii, companion split band springs closely embracing said projections and said lugs, and means holding the split ends of said springs at diametrically opposite points.

3. In a structure of the class described, driving and driven members having loosely interdigitating oppositely directed lugs, a floating element between said members and having projections interdigitating with said lugs, motion transmitting elements between the lugs and the projections, said projections and said lugs being provided with peripheral surfaces having the same radii, companion split band springs closely embracing said projections and said lugs, said projections being provided with radially extending pins for holding the split ends of said springs at diametrically opposite points.

4. In a coupling, driving and driven elements having ends in opposed spaced relation and having spaced annuli secured thereon, oppositely directed interdigitating lugs carried by said annuli, a floating element between said annuli and being provided with radially projecting fingers located between said lugs in circumferentially spaced relation thereto, motion transmitting elements between said lugs and said fingers, and annular springs closely surrounding said fingers and said lugs and also surrounding said motion transmitting elements in restraining relation thereto.

5. In a coupling, rotatable driving and driven elements having ends in opposed spaced relation and having spaced annuli secured thereon, oppositely directed interdigitating lugs carried by said annuli, a floating motion transmitting element between said annuli and being provided with fingers located between said lugs in circumferentially spaced relation thereto, motion transmitting elements between said lugs and said fingers, and annular springs closely surrounding said fingers and said lugs and having means associated therewith normally holding the fingers and lugs in position for movement about a common axis, and a housing secured to one of said annuli and enclosing said lugs, said fingers and said springs and also surrounding the other annuli.

6. In a coupling, driving and driven elements having opposed ends in spaced relation, oppositely directed interdigitating lugs carried by the said ends of the driving and driven elements, a floating motion transmitting element between said ends and being provided with fingers located between said lugs in circumferentially spaced relation thereto, motion transmitting elements between said lugs and said fingers, and annular springs closely surrounding said fingers and said lugs and having means associated therewith normally holding the fingers and lugs about a common axis, and a housing secured to one of said first-named elements, said ends of the driving and driven elements and the adjacent portion of said housing being in restraining relation to said annular springs.

LEWIS SKEEL.